United States Patent [19]

Gandhi et al.

[11] 4,233,188

[45] Nov. 11, 1980

[54] CATALYST FOR TREATING EXHAUST GAS FROM AN INTERNAL COMBUSTION ENGINE

[75] Inventors: Haren S. Gandhi, Farmington Hills; Mordecai Shelef, Birmingham, both of Mich.

[73] Assignee: Ford Motor Company, Dearborn, Mich.

[21] Appl. No.: 64,317

[22] Filed: Aug. 6, 1979

Related U.S. Application Data

[60] Continuation of Ser. No. 963,540, Nov. 24, 1978, abandoned, which is a continuation-in-part of Ser. No. 830,277, Sep. 1, 1977, abandoned, which is a division of Ser. No. 705,642, Jul. 15, 1976, abandoned, which is a continuation-in-part of Ser. No. 607,659, Aug. 25, 1975, abandoned.

[51] Int. Cl.$^3$ .................... B01J 23/44; B01J 23/46; B01J 23/64; B01J 23/74
[52] U.S. Cl. ................................ 252/470; 252/472; 423/213.5
[58] Field of Search .................. 252/470, 472, 466 B; 423/213.2, 213.5, 213.7

[56] References Cited

U.S. PATENT DOCUMENTS

| | | | |
|---|---|---|---|
| 3,895,093 | 7/1975 | Weidenbach et al. | 252/466 PT |
| 4,006,103 | 2/1977 | Meguerian et al. | 252/472 X |

*Primary Examiner*—W. J. Shine
*Attorney, Agent, or Firm*—William E. Johnson; Keith L. Zerschling

[57] ABSTRACT

This invention is directed to an equilibrium catalyst for treating oxides of nitrogen, carbon monoxide and unburned hydrocarbons found in an exhaust gas stream from an internal combustion engine. The catalyst includes a substrate, a selective three-way equilibrium catalyst, an oxygen storage material component for maintaining the activity of the equilibrium catalyst during momentary excursions of the exhaust gas stream into oxygen rich conditions, an active metal component for a water gas and steam reforming process which maintains the overall activity of the equilibrium catalyst when treating an exhaust gas stream deficient in oxygen, and a component for oxidation of hydrocarbons and carbon monoxides when the exhaust gas stream is developed from the burning of air mixtures of about stoichiometric proportions.

3 Claims, No Drawings

CATALYST FOR TREATING EXHAUST GAS FROM AN INTERNAL COMBUSTION ENGINE

This application is a continuation of our prior application Ser. No. 963,540, filed Nov. 24, 1978, now abandoned, which was in turn a continuation-in-part of our prior application Ser. No. 830,277 filed Sept. 1, 1977, now abandoned, which was in turn a division of our prior application Ser. No. 705,642 filed July 15, 1976, now abandoned, which in turn was a continuation-in-part of our application Ser. No. 607,659 filed Aug. 25, 1975, now abandoned.

BACKGROUND OF THE INVENTION AND PRIOR ART STATEMENT

U.S. Pat. No. 3,895,093 issued July 15, 1975 discloses a three-way or equilibrium catalyst specifically designed to handle the exhaust gas stream issuing from an internal combustion engine operating within a very precise and narrow band of air/fuel ratios positioned just slightly on the fuel rich side of stoichiometry. This patent teaches the use of an expensive and sophisticated electronic fuel injection system for metering fuel and air to the engine in the very narrow band of air/fuel ratios required.

In general, equilibrium catalysts are those which attempt to remove most, if not all, of the carbon monoxide, unburned hydrocarbons and oxides of nitrogen present in an exhaust gas stream coming from an internal combustion engine. In the use of this type of catalyst, the air/fuel mixture generally supplied to the engine with which the catalyst is associated is one in which stoichiometric amounts of air and fuel should exist. The catalyst, upon catalytic rearrangement of the undesired components of the exhaust gas stream, eliminates the undesired components by interaction of the components with each other or with the oxygen present in the exhaust gas stream. For example, the catalyst is effective to reduce oxides of nitrogen, thus making available oxygen from this reaction which in turn, can be used in transforming carbon monoxide to carbon dioxide and unburned hydrocarbons to carbon dioxide and water. A stoichiometric air/fuel ratio is generally about 14.7 volumes of air to each volume of fuel although this depends on the exact composition of the fuel being burned.

In using an equilibrium catalyst, there should be just sufficient oxygen present in the air/fuel mixture to burn all of the fuel to the final composition products of carbon dioxide and water. However, in the actual burning of the mixture in the engine, some of the nitrogen present in the air is transformed into oxides of nitrogen, some of the hydrocarbons are not fully burned and some carbon monoxide is formed. Thus, if a stoichiometric air/fuel ratio mixture is burned, even though the products are not the final ones desired, it is merely a matter of rearranging some of the products produced in order to achieve a burning of all of the fuel to its desired final composition products and elimination of all oxides of nitrogen. For example, if the burning in the internal combustion engine is not fully complete and carbon monoxide and unburned hydrocarbons are present, there is sufficient oxygen present in the exhaust gas stream plus the oxygen locked upon the form of oxides of nitrogen to complete the oxidation of the carbon monoxide and unburned hydrocarbons.

U.S. Pat. No. 3,895,093 teaches a specific equilibrium catalyst in which platinum, ruthenium, rhodium and rhenium are present. The patent discloses that this catalyst, with particular ratios of the catalyst elements with respect to each other, is suitable for an equilibrium catalyst. However, the patent discloses that the catalyst must be used in conjunction with an engine running at a precisely controlled air/fuel ratio. This precise control results in the production of an exhaust gas stream having specific concentrations of undesired components having an overall reducing potential.

At this point, we would like to point out that an air/fuel ratio on the rich side of equilibrium means there is an excess of fuel and insufficient oxygen present to burn the fuel, whereas on the lean side of equilibrium there is more oxygen present than is required to burn the fuel present. Thus, the environment in which the catalyst is operating can change from a reducing atmosphere to an oxidizing atmosphere depending on the air/fuel mixture supplied to the engine. We would also like to point out that as a catalyst is subjected to oxidizing and reducing conditions of various potential or strength, the catalyst naturally behaves differently. For example, the reactions which occur under reducing conditions when insufficient oxygen is present over a catalyst are substantially different than those reactions which occur when excess oxygen is available over the catalyst. The reactions also vary as the oxidizing or reducing potential of the exhaust gas stream over the catalyst is increased or decreased.

What the patentees of U.S. Pat. No. 3,895,093 have done is to select a single, operating air/fuel ratio on the fuel rich side of equilibrium and have tailored a precise catalyst to handle the particular composition of exhaust gases produced under the particular set of conditions. In order to use this catalyst as a production catalyst with an automotive engine, it is necessary, as taught by the patentees, to have an elaborate electronic fuel injection system to precisely meter fuel and air to the engine so that the air/fuel ratio varies no more than about 0.1 air/fuel ratio units on either side of the slightly rich air/fuel ratio selected for engine operation. Such an electronic fuel injection system, as is disclosed in the SAE Report 73005 referenced by the patentees, would be complex and costly to manufacture because this system has to have capability to maintain precise air/fuel ratios during such transient vehicle operation modes as acceleration and deceleration.

The patentees of U.S. Pat. No. 3,895,093 do not state in their patent the particular function of the four materials they employ in the disclosed catalyst system. We, however, in view of our long experience in the catalyst field, can state the following with respect to the materials being employed. The patentees teach a very limited operational range which is basically one centered slightly on the rich side of a stoichiometric air/fuel ratio with very minor deviations of no more than 0.1 air/fuel ratio units to either side of the center point. Under these operating conditions we know that the platinum acts as an oxidizing catalyst for oxidizing hydrocarbons and carbon monoxide to end products of water and carbon dioxide. Also, under these conditions the ruthenium principally brings about the reduction of oxides of nitrogen to nitrogen with good selectivity, that is, with little ammonia production. The rhodium is present particularly for the purpose of reducing oxides of nitrogen at near stoichiometric or slightly on the lean side of stoichiometric conditions. The rhenium has good selectivity for the NO to $N_2$ reaction, but rhenium does not convert substantial amounts of oxides of nitrogen. It is also of interest to note that the patentees have not realized that both ruthenium and rhenium must be protected from volatilization of these materials are exposed to oxidizing ambient. This lack of recognition is because the catalyst operating condition proposed by the patentees is one in which the catalyst is not exposed to oxidizing conditions.

It is a principal object of this invention to provide an equilibrium catalyst which is operative at least momentarily over a range of air/fuel ratios extending approximately at least one air/fuel ratio unit on each side of a stoichiometric air/fuel ratio.

It is still another object of this invention to provide an equilibrium catalyst system which may be used with a present day, reasonably priced, air/fuel ratio control system, such as a carburetor, to provide an overall emission control system which is operable during all operating modes of an internal combustion engine to remove from the exhaust gas stream of the engine substantial quantities of carbon monoxide, unburned hydrocarbons and oxides of nitrogen.

SUMMARY OF THE INVENTION

This invention relates to an equilibrium type catalyst for simultaneously treating oxides of nitrogen, carbon monoxide and unburned hydrocarbons found in an exhaust gas stream from an internal combustion engine and, more particularly, to an equilibrium catalyst which is effective in treating an exhaust gas stream generated from the momentary burning of air/fuel mixtures having more than or less than the stoichiometric required amounts of oxygen and fuel up to and including deviations of air/fuel ratio of plus or minus one air/fuel ratio unit from the stoichiometric ratio. This invention also relates to an equilibrium type catalyst for use with conventional carburetion systems now known for the purpose of eliminating simultaneously oxides of nitrogen, carbon monoxide and unburned hydrocarbons from the exhaust gas stream exhausted from the engine having the conventional carburetion system thereon.

In accordance with the teachings of this invention, an equilibrium catalyst includes a substrate such as those well known in the art having a high surface area to volume ratio. The substrate may be either a monolithic substrate or a pelletized substrate.

A selective three-way equilibrium catalyst selected from the group consisting of rhodium or iridium is present on the substrate in an amount of from about 10 ppm (parts per million) to about 5000 ppm, preferably from about 50 ppm to about 500 ppm. This selective three-way equilibrium catalyst has excellent three-way selectivity when treating exhaust gases produced by burning air/fuel mixtures of about stoichiometric proportions. By excellent selectivity, we mean that this material is very active in the reduction of oxides of nitrogen to nitrogen without the formation of significant amounts of ammonia. This catalyst is also effective in the oxidation of carbon monoxide and hydrocarbons to their respective end products of carbon dioxide and water. The selective three-way equilibrium catalyst, however, finds its main use in the time when the exhaust gases being supplied thereto are developed from an engine operating in the range of plus or minus one air/fuel ratio unit about the stoichiometric ratio to reduce oxides of nitrogen found in the gas stream. This is the principal reason why we have included the selective three-way equilibrium catalyst selected from the group of rhodium or iridium in the equilibrium type catalyst system disclosed herein which may be used with conventional carburetion systems.

Our equilibrium catalyst also includes an oxygen storage material which is deposited on the catalyst substrate. This oxygen storage material is selected from the group of base metals or oxides thereof which can undergo rapid changes in oxidation state. The oxygen storage material may be, for example, rhenium or a manganese oxide, provided that if rhenium is used, it is also protected from volatization when oxidized to its higher valence state. The oxygen storage material is present on the substrate in an amount from 500 ppm to about 50,000 ppm, preferably from about 1000 ppm to about 20,000 ppm.

We include such an oxygen storage material in our catalyst system because the material is capable of temporarily withdrawing and storing oxygen from the exhaust gases produced by burning an air/fuel mixture in the engine having more oxygen present than necessary to burn all of the fuel present, that is, when the air/fuel ratio supplied to the engine runs to the lean side of stoichiometry. During such brief oxygen rich periods, the oxygen storage material is oxidized from its metallic state or lower valence metallic oxide state to pick up oxygen and the catalyst system, in general, continues to operate as if the air/fuel ratio was stoichiometric. Under reducing conditions, when the oxygen storage material is in a metallic state or its lower valence metallic oxide state, the metal or metal oxide may act as a catalyst for some reactions. For example, if rhenium is used as the oxygen storage material, under slightly reducing conditions this metal will reduce oxides of nitrogen found in the gas stream to nitrogen with good selectivity but at a low rate.

However, the primary reason we have included an oxygen storage material such as rhenium is so that the catalyst system, in its entirety, may be operated in momentary periods of time when oxygen rich conditions occur in the exhaust gases. Thus, the oxygen storage material acts as an efficient leveller of air/fuel stoichiometry. This action provides the latitude to the catalyst which is necessary if the catalyst is going to be used in conjunction with an engine running on a standard carburetor which can control the air/fuel ratio of the mixture being fed to the engine only in the range of about plus or minus one air/fuel ratio from the stoichiometric condition during transient operation modes, such as acceleration and deceleration, but can control the mixture quite close to the stoichiometric during normal engine operations. In other words, this oxygen storage material provides to our catalyst system the latitude which is necessary for that catalyst system to continue effective operation even though there are momentary conditions in which excess oxygen is found in the exhaust gases.

A water gas and steam reforming catalyst selected from the group consisting of ruthenium, nickel and tungsten is also present on the substrate for the purpose of catalyzing the water gas and steam reforming reaction whereby carbon monoxide and hydrocarbons are formed directly into final products of water and carbon dioxide during times when the exhaust gases are momentarily fuel rich. If ruthenium is the water gas and steam reforming catalyst, it is present on the substrate from about 50 ppm to 10,000 ppm, preferably from about 100 ppm to about 1,000 ppm. If ruthenium is used, it must be protected so that it does not volatilize during times when excess oxygen is available to the catalyst system. If tungsten or nickel is used as the catalyst, it is present from about 500 ppm to about 10,000 ppm, preferably from about 1,000 ppm to about 3,000 ppm.

We have included a catalyst which is active in the water gas and steam reforming reactions to remove carbon monoxide and unburned hydrocarbons by such reactions from exhaust gases produced by burning air/fuel mixtures having more fuel than can be completely oxidized by the oxygen present in the mixture. In other words, when our overall catalyst system is exposed to exhaust gases generated by burning rich air/fuel mixtures in the engine associated therewith, this water gas and steam reforming catalyst is effective by the water gas and steam reforming reactions to eliminate directly carbon monoxide and unburned hydrocarbons from the stream. In effect, this catalyst permits excursions of the engine into rich air/fuel mixtures allowing the use of conventional carburetion systems for the engine which produces such a fuel rich condition, for example, on rapid deceleration.

The metal used for the water gas and steam reforming reaction may be useful in carrying out other reactions when the gases over the catalyst have been generated by burning different mixtures of air and fuel. For example, if ruthenium is used, at air/fuel ratios close to stoichiometric, but on the slightly rich side thereof, the ruthenium will not work principally as a water gas and steam reforming catalyst, but rather, will catalize the reduction of oxides of nitrogen with good selectivity. However, the principal reason we have included this metal as the water gas and steam reforming catalyst is not to take advantage of its potential for reducing oxides of nitrogen, although we achieve that benefit at some air/fuel ratios, but rather, it is included to be available for treating exhaust gases having excessive amounts of carbon monoxide and unburned hydrocarbons. This is what gives us the latitude to use the catalyst system with conventional carburetion techniques, rather than electronic fuel injection systems of a complex and costly nature.

An oxidation catalyst selected from the group consisting of platinum and palladium is also present on the catalyst substrate from about 500 ppm to about 10,000 ppm, preferably from about 1,000 ppm to 5,000 ppm. The oxidation catalyst is effective under conditions about the stoichiometric air/fuel ratio and to the plus and minus one units of air/fuel ratio on either side of the stoichiometric ratio for oxidizing carbon monoxide and unburned hydrocarbons. This is the potential role of this material and this is why it is included. Under rich air/fuel regions, the elimination of carbon monoxide and hydrocarbons is not controlled principally by this metal, but rather by the water gas and steam reforming catalyst.

In accordance with the detailed teachings of this invention, a suitable oxygen storage material is rhenium. When the rhenium is present on the substrate, the substrate also contains sufficient refractory oxides to protect against volatilization of the volatile oxide forms of rhenium which are produced upon oxidation thereof.

DESCRIPTION OF THE PREFERRED EMBODIMENT

This invention is directed to an equilibrium type catalyst which is effective in treating exhaust gases containing oxides of nitrogen, carbon monoxide and unburned hydrocarbons. The catalyst of this invention extends the operative range over which the equilibrium catalyst is effective in treating exhaust gases in that the air/fuel ratio of fuel mixtures being fed to the engine may vary momentarily under transient engine operating conditions plus or minus 1.0 air/fuel ratio units from a stoichiometric condition and still the catalyst will be efficient and effective in operation.

In general, equilibrium type catalysts are used in treating exhaust gases produced when stoichiometric amounts of air and fuel are burned in an engine. Normally, upon such burning, carbon monoxide, oxides of nitrogen and unburned hydrocarbons remain in the exhaust gases. However, in treating the exhaust gases, it is only necessary to rearrange catalytically components found in the exhaust gas stream in order to achieve a complete burning of the fuel. For example, sufficient oxygen is present in the exhaust gases, along with the oxygen coupled in the form of oxides of nitrogen, to provide all the oxygen that is required to burn the hydrocarbon fuel and carbon monoxide to the desired finished products of water and carbon dioxide.

When stoichiometric amounts of air and fuel are burned in an engine, it is not necessary to add any further elements to the exhaust gases in order to achieve a complete burning thereof. However, when the mixture fed to the engine varies either on the rich fuel side or lean fuel side from stoichiometric, on the one hand an oxygen deficient exhaust stream is produced, and on the other hand an oxygen rich exhaust stream is produced. Normal equilibrium catalyst have difficulty in handling such oxygen rich or oxygen deficient exhaust gases because of the following reasons.

If the exhaust gas stream is rich in oxygen, the oxygen present preferentially reacts with all of the carbon monoxide and unburned hydrocarbons in order to form the final combustion products of water and carbon dioxide. Thus, the oxides of nitrogen are not reduced and they pass by the catalyst without being treated. On the other hand, if the exhaust gases are rich in hydrocarbon fuel and deficient in oxygen, all of the unburned hydrocarbons and carbon monoxide are not oxidized to their final desired compounds and some carbon monoxide and unburned hydrocarbons pass out beyond the converter. However, because the system is deficient in oxygen, it is effective in removing the oxides of nitrogen by reduction.

U.S. Pat. No. 3,895,093 teaches a three-way or equilibrium catalyst designed to operate slightly on the fuel rich side of stoichiometric conditions with extremely small variances of air/fuel ratios being fed to the engine. In order to achieve such a very narrow and tight band of air/fuel mixtures, the patentee teaches the use of an electronic fuel injection system, such as disclosed in the SAE Report 73005, to assure a precise metering of fuel and air to the engine to achieve the very highly controlled and very narrow range of operative air/fuel ratios. The use of electronic fuel injection apparatus, of course, increases the cost and complexity of the fuel metering system substantially above the known carburetion systems which are presently employed in vehicle engine applications. The catalyst system disclosed in U.S. Pat. No. 3,895,093 in operation never would see either a highly reducing condition wherein excess fuel is present in the exhaust gases to be treated or oxidizing conditions in which excess oxygen is available in the system. With respect to the oxidizing conditions, the patentee's lack of use of the catalyst in an oxidizing ambient is made even more apparent when one realizes that ruthenium and rhenium which are disclosed catalyst materials do oxidize under oxidizing conditions at high temperatures to produce oxides thereof which are volatile. Thus, if the system disclosed in this patent was operated in an oxidizing ambient at operational temperatures for a period of time, both the ruthenium and the rhenium would volatilize and disappear from the system, as the patentees have provided no protection therefor.

In accordance with the teachings of this invention, a suitable substrate material having a high surface area to volume ratio is selected so that the materials forming the catalyst system of this invention may be deposited thereon. The substrate may be a pelletized material, or it may be a monolithic substrate. In either case, the substrate can be treated with a material such as gamma alumina in order to develop a very high surface area to volume ratio. Other oxide coatings which may be placed on the substrate in order to increase its surface area to volume ratio include refractory oxides such as silica, magnesia, titiania, zirconia or mixtures thereof. These materials may be deposited on the substrate by suspending such materials in a suitable solution and then dipping or spraying this solution in or on the substrate by many of the procedures which are well known in the art. Thereafter, as is well known in the art, the substrate is dried and heated to a temperature of 1200° F., generally in order to set the high surface area coating on the substrate.

We will now describe the various materials which will be deposited on the substrate in order to form the catalyst system of this invention. These materials are all known to those skilled in the art and the art knows many different methods by which such materials may be deposited. These materials may be deposited simultaneously from the same solution having the proper ratios of materials therein, or they may be deposited one after the other without any particular order to the materials which are deposited. Such materials may also be deposited, for example, from two different solutions with each solution containing one or more of the materials. As stated above, the techniques for depositing such materials on a substrate are well known in the art and do not form part of this invention.

A selective three-way catalyst selected from the group consisting of rhodium, iridium, or mixtures of rhodium and iridium, is impregnated on the substrate. These materials have an excellent three-way selectivity when treating exhaust gases produced by burning air/fuel mixtures of about stoichiometric proportions. That is why we have selected these materials for deposition on a substrate. When our catalyst system is in an operating mode, the system will have this three-way catalyst present to treat exhaust gases produced by burning air/fuel mixtures of about stoichiometric proportions to remove therefrom oxides of nitrogen. When exhaust gases pass over these materials and have such a stoichiometrically balanced amount of materials therein, the rhodium and/or iridium is effective in the three-way treatment of gases to reduce oxides of nitrogen and to oxidize unburned hydrocarbons and carbon monoxide to their desired final components, namely carbon dioxide and water, without the formation of substantial amounts of ammonia. The selective three-way catalyst material is present on the substrate in an amount from about 10 ppm to 5,000 ppm, preferably from about 50 ppm to 500 ppm. When the catalyst system is treating exhaust gases having a less than required amount of oxygen therein produced by burning rich air/fuel ratio mixtures in the engine, the selective three-way catalyst does not carry out any significant catalytic rearrangements of undesirable products.

An oxygen storage material is also placed on the substrate in a finely divided state. This oxygen storage material can be selected from the group of base metals or oxides thereof which undergo large and rapid changes in oxidation state. For example, a metal such as rhenium and an oxide form of manganese are acceptable. The oxygen storage material is present in an amount from about 500 ppm to 50,000 ppm, preferably 1,000 ppm to 20,000 ppm on the substrate. The oxygen storage material is capable of temporarily withdrawing and storing oxygen from exhaust gases produced by burning air/fuel mixtures having more oxygen present than necessary to burn all the fuel present. The metal or lower valence metal oxide, by oxidizing to its higher valence state, takes oxygen out of the local ambient and stores it until reducing conditions once again occur. The oxygen storage material is effective for withdrawing oxygen only for a limited period of time, such as a small period of 1 to 20 seconds, preferably less than 5 seconds in which excess oxygen is present in the exhaust gas. Normally, such storage is sufficient because the excursion of the exhaust gases into zones having an excess amount of oxygen is only for a very limited period of time during transient modes of engine operation. During this time, the oxygen storage material stores up oxygen and the selective three-way catalyst is free to operate as if it were treating exhaust gases produced by burning an air/fuel mixture of stoichiometric proportions. Thus, the oxygen storage material extends the operative range of an equilibrium catalyst into momentary conditions when the air/fuel mixture being burned is deficient in fuel and resultant exhaust gases contain excess oxygen.

The oxygen storage material may also be a catalyst under reducing conditions when it has been reduced to its metallic state or its lower valence oxide state. For example, if rhenium is chosen as the oxygen storage material, under reducing conditions it is metallic rhenium. This metallic rhenium is effective under near stoichiometric conditions in the reduction of oxides of nitrogen to nitrogen. The rhenium is very selective in this reaction producing little, if any, ammonia, but the rhenium does have a low activity for this reaction and, thus, will not account for conversion of a very significant quantity of oxides of nitrogen.

As described above, there are many prior art techniques taught for depositing the materials such as the oxygen storage material on the substrate. One way of depositing rhenium on the substrate, for example, is described in our co-pending application entitled "Method of Momentarily Extending the Operative Range of an Equilibrium Type Catalyst" filed Aug. 25, 1975 as Ser. No. 607,660, now abandoned, and assigned to the same assignee as this application. Our co-pending application is incorporated herein by reference. When rhenium is used as the oxygen storage material, it is also necessary to protect the same from volatilization under oxidizing conditions, as certain oxides of rhenium are volatile. Our U.S. Pat. No. 4,006,102 entitled "Stabilized Rhenium Catalyst" assigned to the same assignee as this application teaches a method of stabilizing rhenium under such conditions by the use of sufficient amounts of a refractory oxide coating. This coating insures that any higher oxide rhenium which may volatilize is trapped and condensed as a stable oxide form. This application is also hereby incorporated by reference.

The substrate also has placed thereon a catalyst which is effective for carrying out a water gas and steam reforming reaction. This catalyst is selected from the group consisting of ruthenium, nickel and tungsten. If the catalyst selected is ruthenium, it is present on the substrate from about 50 ppm to about 10,000 ppm, preferably from about 100 ppm to 1,000 ppm. If tungsten or nickel is selected as the catalyst, it is present from about 500 ppm to 10,000 ppm, preferably from about 1,000 ppm to about 3,000 ppm. If tungsten is used as the catalyst, it may be placed on the substrate as is known in the art from a solution containing tungstic acid.

If ruthenium is used as the catalyst, it must be protected during oxidizing conditions. If the ruthenium is not protected, it forms a volatile oxide state which is dissipated into the surrounding ambient and thereby gradually lost from the catalyst system. Methods of stabilizing ruthenium are taught in our U.S. Pat. Nos. 3,835,069 and 3,880,775, as well as in our co-pending application Ser. No. 652,913 for a "Method of Stabilizing a Ruthenium Catalyst System" filed Jan. 28, 1976 as a continuation of application Ser. No. 505,119 which was filed Sept. 11, 1974, both of which are hereby incorporated by reference.

We have placed this water gas and steam reforming catalyst on the substrate principally for the purpose that the same is used to remove carbon monoxide and unburned hydrocarbons from the exhaust gases produced by burning an air/fuel mixture having more fuel therein than can be completely oxidized by the oxygen present in the mixture. Under such fuel rich conditions, the oxides of nitrogen are normally reduced by the carbon monoxide and unburned hydrocarbons present in the exhaust gas stream. However, there is insufficient oxygen available to oxidize all unburned hydrocarbons and carbon monoxide present. These materials are transformed into their final components through this catalyst by a water gas shift reaction in which water gas and carbon monoxide are transformed into carbon dioxide and hydrogen, or a steam reforming reaction in which hydrocarbons react with water gas to form hydrogen and carbon dioxide.

By having the water gas and steam reforming catalyst present, the equilibrium catalyst system can be used under conditions in which it would normally not operate, that is, under momentary conditions in which extremely rich air/fuel mixtures are being burned in the engine. The equilibrium catalyst of this invention includes the water gas and steam reforming catalyst to carry on efficient and effective cleansing of carbon monoxide and unburned hydrocarbons by the system at a point where the normal oxidization catalyst provided is not effective because of the lack of oxygen in the system.

We should also like to note that if the water gas and steam reforming catalyst selected is ruthenium, it will also be operative at air/fuel ratios near stoichiometry, but slightly on the rich side to act as a $NO_x$ catalyst. Thus, using ruthenium has two benefits, one in that it acts close to stoichiometry as an $NO_x$ catalyst, and on the rich side of stoichiometry as a water gas and steam reforming catalyst. While we obtain the secondary benefit of the $NO_x$ catalyst by using ruthenium, we have primarily selected this material for our catalyst system for its use in the water gas and steam reforming reaction.

An oxidation catalyst selected from the group consisting of platinum and palladium is also present on the substrate. The oxidation catalyst is present on the substrate from about 500 ppm to about 10,000 ppm, preferably from about 1,000 ppm to about 5,000 ppm. These materials may be impregnated on the substrate from their corresponding chloride salt solutions in accordance with techniques well known in the art. The oxidation catalyst is effective under all conditions in which sufficient oxygen is available in the exhaust gases to assist in oxidizing carbon monoxide and unburned hydrocarbons to the desired final products of carbon dioxide and water.

There has been disclosed herein an equilibrium catalyst system which has the capability of operating and treating exhaust gas generated by burning air/fuel mixtures other than stoichiometric during momentary changes in engine operating modes and, thus, permits the use of conventional carburetion techniques for feeding air/fuel mixtures to the engine. The system includes materials which extend the operative range of the entire catalyst system to the treatment of exhaust gases produced by air/fuel mixtures which are momentarily either rich in fuel or fuel deficient during transient engine operation modes, such as acceleration and deceleration.

In view of this specification, those skilled in the art will be able to make modifications of the invention which fall within the true spirit and scope thereof. It is intended that all such modifications be included within the claims.

What we claim is:

1. A catalyst for treating oxides of nitrogen, carbon monoxide and unburned hydrocarbons found in an exhaust gas stream from an internal combustion engine operating with an air/fuel feed system capable of producing air/fuel ratios which vary as much as 1.0 units of air/fuel ratio to the rich and lean sides of a stoichiometric ratio, which catalyst comprises:

a substrate having a high surface area to volume ratio;

a selective three-way equilibrium catalyst formed of iridium present on said substrate in an amount from about 10 ppm to about 5,000 ppm, said selective three-way equilibrium catalyst being a catalyst having excellent three-way selectivity when treating exhaust gases produced by burning air/fuel mixtures of about stoichiometric proportions an oxygen storage material on said substrate selected from the group of base metals or base metal oxides which can undergo rapid changes in oxidation state, said oxygen storage material being present in an amount from about 500 ppm to about 50,000 ppm, said oxygen storage material being capable of temporarily withdrawing and storing oxygen from exhaust gases produced when air/fuel mixtures having more oxygen present than necessary to burn all the fuel present are burnt, whereby during brief oxygen rich periods said oxygen storage material can take up oxygen and the catalyst operate as if the air/fuel ratio was stoichiometric;

a catalyst selected from the group consisting of nickel and tungsten, said catalyst being present on said substrate in an amount from about 500 ppm to about 10,000 ppm, said catalyst being effective to remove carbon monoxide and unburned hydrocarbons from exhaust gases produced when air/fuel mixtures having more fuel than can be completely oxidized by the oxygen present in the mixture are burnt; and an oxidation catalyst formed from palladium, said oxidation catalyst being present on said catalyst substrate from about 500 ppm to about 10,000 ppm, said oxidation catalyst being effective under conditions in which sufficient oxygen is available in the exhaust gases for oxidizing carbon monoxide and unburned hydrocarbons.

2. The catalyst of claim 1 wherein: said selective three-way equilibrium catalyst is present on said substrate in a range from about 50 ppm to about 500 ppm, said oxygen storage material is present on said substrate in a range from about 1,000 ppm to about 20,000 ppm, said catalyst is present on said substrate in a range from about 1,000 ppm to about 3,000 ppm, and said oxidation catalyst is present on said substrate in a range from about 1,000 ppm to about 5,000 ppm.

3. A catalyst for treating oxides of nitrogen, carbon monoxide and unburned hydrocarbons found in an exhaust gas stream from an internal combustion engine operating with an air/fuel feed system capable of producing air/fuel ratios which vary as much as 1.0 units of air/fuel ratio to the rich and lean sides of a stoichiometric ratio, which catalyst comprises:

a substrate having a high surface area to volume ratio;

a selective three-way equilibrium catalyst selected from the group consisting of rhodium and iridium present on said substrate in an amount from about 10 ppm to about 5000 ppm, said selective three-way equilibrium catalyst being a catalyst having excellent three-way selectivity when treating exhaust gases produced by burning air/fuel mixtures of about stoichiometric proportions;

an oxygen storage material on said substrate selected from the group of base metals or base metal oxides which can undergo rapid changes in oxidation state, said oxygen storage material being present in an amount from about 500 ppm to about 50,000 ppm, said oxygen storage material being capable of temporarily withdrawing and storing oxygen from exhaust gases produced when air/fuel mixtures having more oxygen present than necessary to burn all the fuel present are burnt, whereby during brief oxygen rich periods said oxygen storage material can take up oxygen and the catalyst operate as if the air/fuel ratio was stoichiometric;

a catalyst selected from the group consisting of nickel and tungsten, said catalyst being present on said substrate in an amount from about 500 ppm to about 10,000 ppm, said catalyst being effective to remove carbon monoxide and unburned hydrocarbons from exhaust gases produced when air/fuel mixtures having more fuel than can be completely oxidized by the oxygen present in the mixture are burnt; and an oxidation catalyst consisting of palladium, said oxidation catalyst being present on said catalyst substrate from about 500 ppm to about 10,000 ppm, said oxidation catalyst being effective under conditions in which sufficient oxygen is available in the exhaust gases for oxidizing carbon monoxide and unburned hydrocarbons.

* * * * *